United States Patent [19]

Michelbrink et al.

[11] Patent Number: 4,580,676
[45] Date of Patent: Apr. 8, 1986

[54] CHAIN CONVEYOR

[75] Inventors: Bernhard Michelbrink, Wesel-Bislich; Karl Bleckmann, Wesel, both of Fed. Rep. of Germany

[73] Assignee: Deutsche Babcock Aktiengesellschaft, Oberhausen, Fed. Rep. of Germany

[21] Appl. No.: 408,288

[22] Filed: Aug. 16, 1982

[30] Foreign Application Priority Data

Aug. 18, 1981 [DE] Fed. Rep. of Germany ....... 3132517

[51] Int. Cl.⁴ .............................................. B65G 45/00
[52] U.S. Cl. .................................... 198/497; 198/735; 198/837
[58] Field of Search ............... 198/497, 731, 735, 550, 198/837

[56] References Cited

U.S. PATENT DOCUMENTS

| 1,503,711 | 8/1924 | Robey | 198/497 |
| 4,093,065 | 6/1978 | Temme | 198/735 |
| 4,122,003 | 10/1978 | Hamilton | 198/550 X |

Primary Examiner—Joseph E. Valenza
Assistant Examiner—David A. Bucci
Attorney, Agent, or Firm—Max Fogiel

[57] ABSTRACT

A chain conveyor in which two chains are connected together by scrapers and circulate in a casing, which are guided around rollers. In the direction of movement of the chain, in front of and above the entry of the chain into a roller, a shaped component is provided. The latter penetrates into the roller over a portion of the roller circumference. On its side remote from the roller, the shaped component is equipped with a deflector surface pointing towards the interior of the casing, the front edge of which surface is aligned with the shaped component.

6 Claims, 6 Drawing Figures

Fig. 2
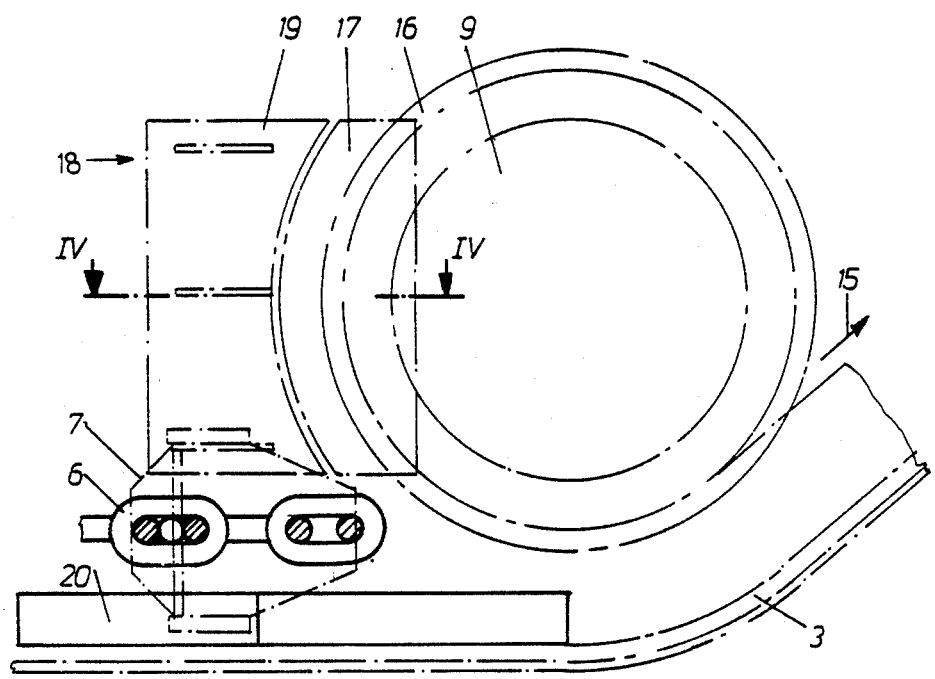
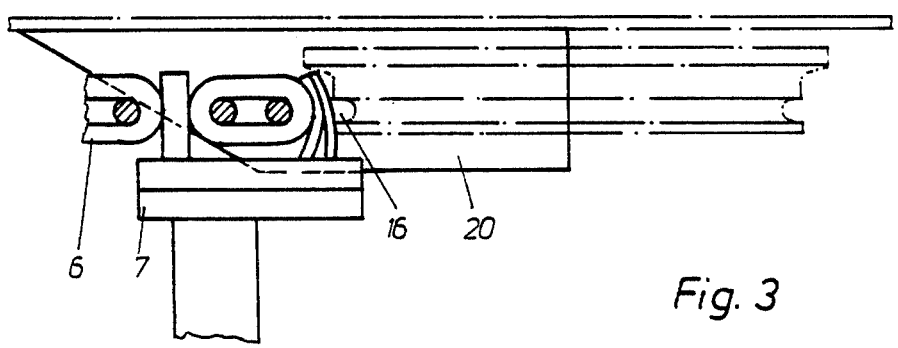
Fig. 3

CHAIN CONVEYOR

BACKGROUND OF THE INVENTION

The present invention relates to a chain conveyor provided with two chains connected together by scrapers, which circulate inside a casing consisting of bottom and side walls and are guided around rollers.

Chain conveyors of this class can be used as wet ash removers and disposed below the combustion chamber or a gas flue of a steam boiler. For such an application, the conveyors must be capable of storing a specific quantity of ash when the conveyor for various reasons is out of action, or very large quantities of ash suddenly arrive from the combustion chamber. It must then be possible to extract these quantities without difficulties when the conveyor is started up again.

In particular, in the case of so-called soot blowing, the conveyors may be filled up to the upper edge of the casing. When the conveyor is switched on again, an ash build up can occur in the region of the change-direction rollers disposed at the transition from the horizontal to the inclined portion of the conveyor. Due to the low degree of filling in the inclined portion, the ash builds up at the transition. The conveyor thereby comes to a stop after a short time. It has been found that the chains force the ash underneath the change-direction rollers. Due to the wedging action of the roller radii, the ash is compacted, so that a blockage occurs here.

SUMMARY OF THE INVENTION

The object underlying the present invention is to further develop a conveyor of the initially mentioned type so that the conveyed material cannot become jammed between the chain and the rollers.

This object is achieved, according to the present invention, in that, in the conveying direction, before and above the entry of the chain into the roller, a shaped component is provided, which fits around the roller over a portion of the roller circumference. In an advantageous embodiment of the invention, the shaped component can be equipped, on its side remote from the roller, with a deflector surface pointing towards the interior of the casing, the front edge of which surface is aligned with the shaped component.

In the conveyor according to the present invention, the ash is prevented by the shaped component from penetrating into the space beneath the roller. Thus the risk that the ash will become compacted at this position is counteracted. In addition, the ash can be forced away from the roller by the deflector surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is one of the change-direction rollers in side view and enlarged scale;

FIG. 3 is a plan view on FIG. 2;

DESCRIPTION OF THE PREFERRED EMBODIMENTS

Figure 1:
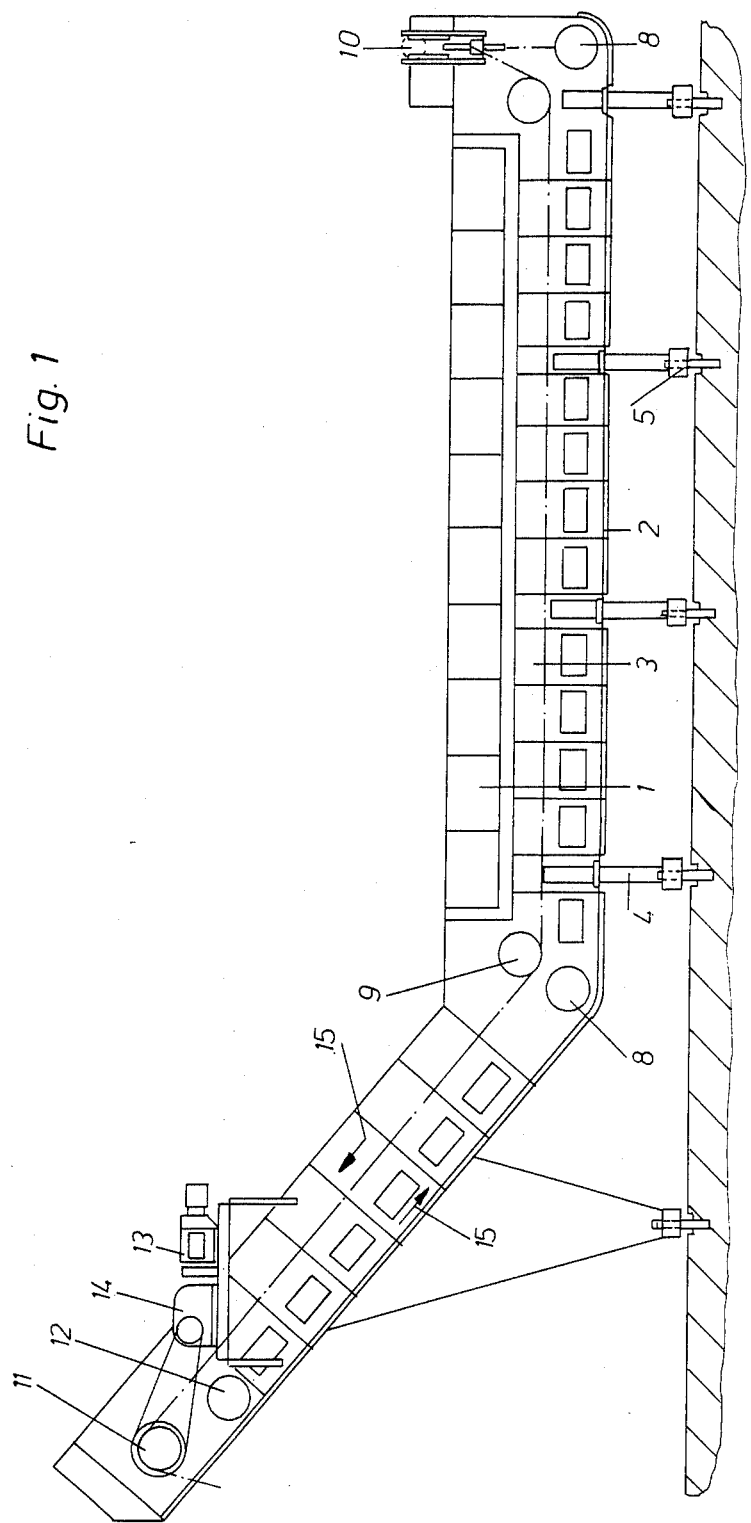
FIG. 1 is a chain conveyor in side view.

The illustrated conveyor serves as an ash remover and is disposed, for this purpose, below the hopper of a combustion chamber or of a gas flue of a coal-fired steam boiler. It consists of two side walls 1, a base 2 and an intermediate base 3, parallel to the base 2. The conveyor possesses a horizontal portion and an upwardly inclined portion. The casing of the conveyor, consisting of the side walls 1 and base 2, is furnished with supports 4, at the lower end of which travelling rollers 5 are disposed, by means of which the conveyor can be traversed transversely to its longitudinal direction.

Inside the casing there run two chains 6, for example two round bar chains, which are connected by scrapers 7. The chains 6 are conducted around rollers, that is the change-direction rollers 8 and 9, the overhung mounted tensioning rollers 10, the chain drive wheels 11 and the return rollers 12. The chain drive wheels 11, which are driven by a motor 13 and gear 14, move the chains 6 in a movement direction which is indicated by the arrows 15. For seating the chains 6, the rollers 8, 9, 10, 12 are equipped with a circumferential groove 16 or a wheel rim. The conveyed material is fed to the conveyor through the open-topped casing of the horizontal portion. The scrapers 7 of the upper side of the chains 6 slide over the intermediate base 3 and convey the material to a discharge at the end of the inclined portion. The lower side of the chain is guided over the base 2.

At least the change-direction roller 9 which is disposed at the transition from the horizontal into the inclined portion of the conveyor, is equipped with a shaped component 17. The shaped component 17 is adapted on its one side to the surface contour of the change-direction roller 9 and fits, in the manner of a die, into the circumferential groove 16 or the depression inside the wheel rim of the change-direction roller 9 over a portion of its circumference. The shaped component 17 is immovable relative to the roller 9 and, to facilitate the removal of this overhung mounted roller 9, is fixed to a removable flange 25 of the roller 9. It is so arranged relative to the change-direction roller 9 that the penetration of the shaped component 17 is situated in front of and above the entry of the chain 6 into the circumferential groove 16 of the roller 9. If the roller 9 possesses neither a circumferential groove 16 nor a wheel rim, but a smooth circumference, then the shaped component 17 is likewise not profiled and is disposed at a short distance from the change-direction roller.

On its side remote from the change-direction roller 9, the shaped component 17 is furnished with a deflector surface 18 pointing towards the interior of the casing. The deflector surface 18 is advantageously formed of a metal sheet 19, which is fixed at the same level as the component 17, and separately from it, to the side wall 1 of the casing. The sheet 19 lies parallel to the side wall 1, its one edge extending as far into the interior of the casing as the innermost situated edge of the shaped component 17. The other edge of the plate 19 bears against the side wall 1.

On the intermediate base 3 a flat guide wedge 20 is mounted, the width of which is somewhat greater than the width of the change-direction roller 9. In opposition to the movement direction 15 of the chains 6, the front edge of the guide wedge 20 tapers to a point. As can be seen from FIGS. 2 and 3, the guide wedge 20 extends to beneath the center of the change-direction roller 9. Between the guide wedge 20 and the roller 9, a spacing is maintained such that the chain 6 can be guided without constraint over the guide wedge 20. The ash or other conveyed material is prevented by the guide wedge 20 from penetrating into the zone of the change-direction roller 9 beneath the chain 6. In addition, foreign objects are conducted towards the center of the casing.

Figures 5, 6:
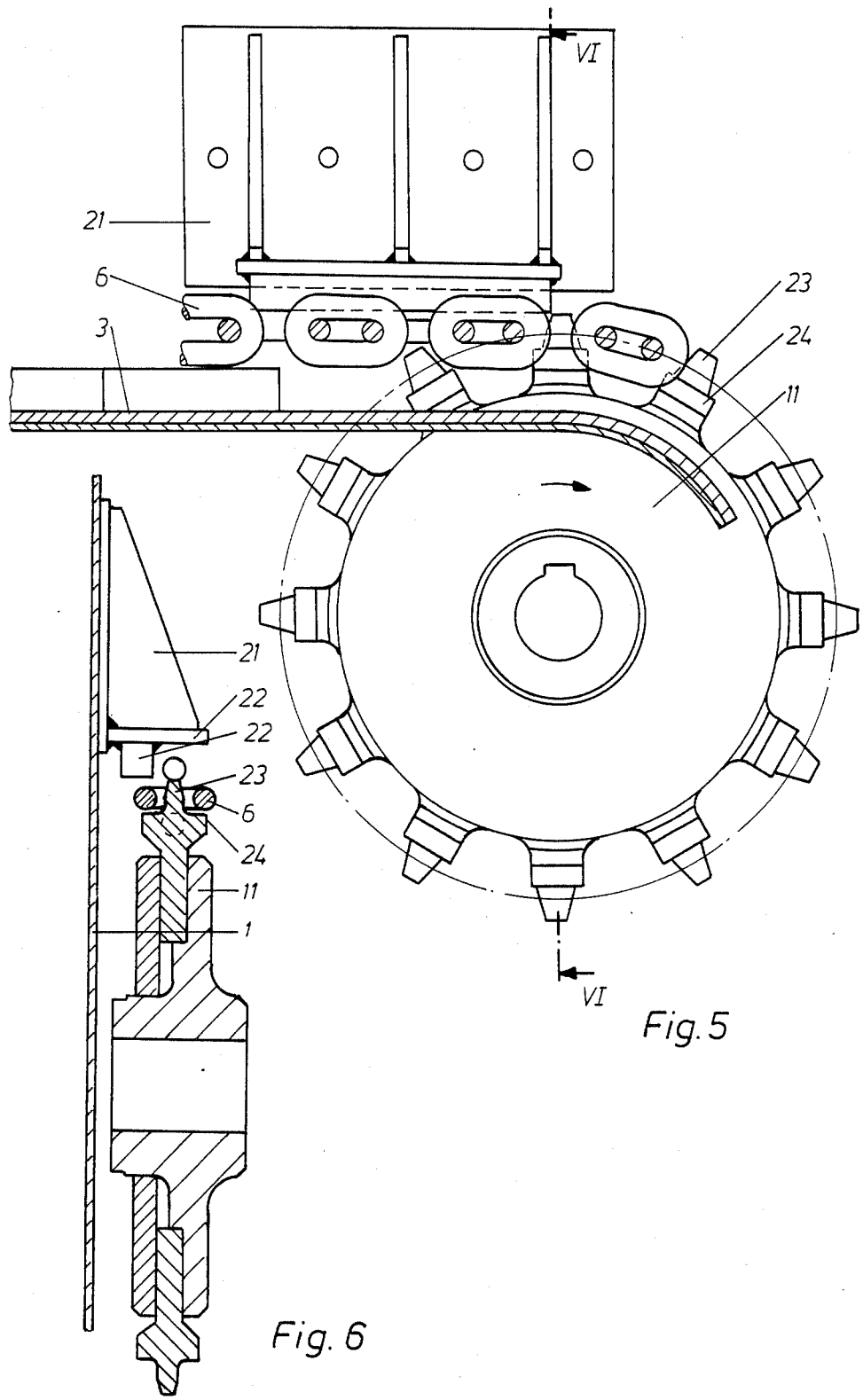
FIG. 5 is a chain drive wheel in side view.
FIG. 6 is a section VI—VI according to FIG. 5.

The described guide wedge 20 can be fitted on the base 2 or intermediate base 3 beneath the chain 6 in the direction of movement 15 of the chain in front of each roller which comes into contact with the conveyed material. In particular, it is recommended to provide such a guide wedge 20 not only in front of the change-direction roller 9 but also in front of the chain drive wheel 11. Since, as illustrated in FIG. 5, the center of rotation of the chain drive wheel 11 is disposed beneath the intermediate base 3, the rearward edge of the guide wedge 20 projects to just above the outer edge of the chain drive wheel 11.

Since the chains 6 are loaded to their loading limit in the case where the described conveyor is completely filled with conveyed material, there is a risk of a chain jump-off occurring at the chain drive wheel 11. In order to prevent this in conjunction with the guide wedges 20, a holding-down device 21 is fixed to the side wall 1 of the casing above the chain 6 in the region of the chain drive wheel 11. This holding-down device 21 comprises two metal flats 22, disposed at right angles to each other. The distance of the flats 22 of the holding-down device 21 from the chain drive wheel 11 is equal to the guide of the chain 6 produced by the length of the tooth 23, above the tooth base 24 of the chain drive wheel 11.

In summary, the deflector surface 18 is formed by the metal sheet 19. This metal sheet 19 is shown in FIG. 2.

The deflector surface 18 supports the operation of the shaped component 17, in the respect that it deflects aside the material which is conveyed in the direction of the roller by the scrapers. Thus, without the shaped component, the deflector surface is not in the position to prevent ash from penetrating the space between the chain and the roller. The present invention proceeds from the condition that a large amount of ash suddenly drops into the ash remover. In such a case, the roller located in vicinity of the bottom is poured over with ash, so that the roller is surrounded entirely by ash. The shaped component encloses or surrounds only a part of the circumference groove of the roller, and in particular it is the part which lies in front of the point of entry of the chain. The predetermined space of the roller is thereby covered, so that the ash dropping from above cannot penetrate into this space and lead there to jamming of the chain.

Figure 4:
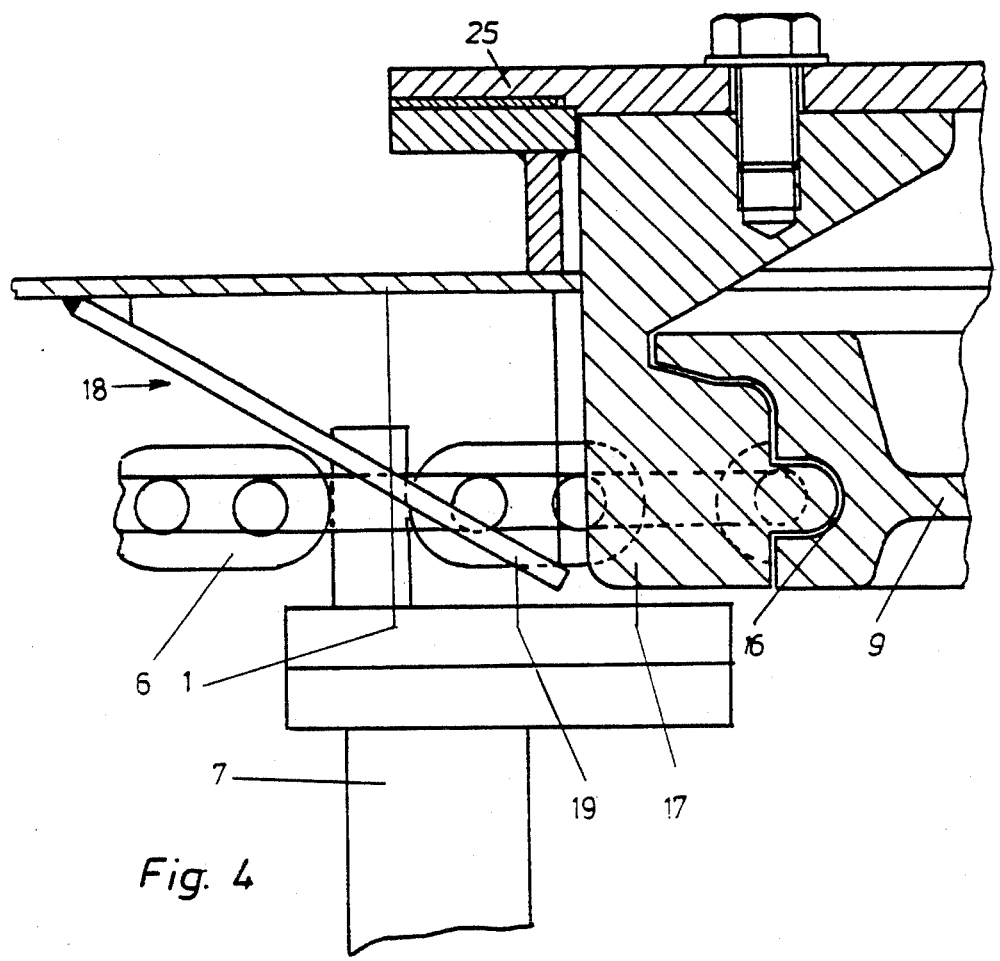
FIG. 4 is a section IV—IV according to FIG. 2.

The shaped component 17 is fixedly arranged in the ash remover opposite the roller 9, and extends, as clearly seen in FIG. 4, into the circumferential groove 16 of the roller 9.

To enable the roller 9 to turn, the latter is mounted on a fixed axis. This axis (not shown) is mounted on the flange 25.

The deflector surface 18 is separate from the shaped component 17 and is mounted on the sidewall 1 of the housing of the wet ash remover.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Chain conveyor comprising: two chains connected together by scrapers; a casing having a base and side walls, said scrapers circulating inside said casing and being guided around roller means; a shaped component fitting around a roller of said roller means over a portion of the roller circumference in front of and above the entry of the chain into said roller in the movement direction of the chain, so that conveyed material is prevented by said shaped component from penetrating into space beneath the roller whereby the conveyed material cannot become jammed between the chain and said roller means; a deflector surface pointing towards the interior of said casing, said deflector surface having a front edge in alignment with said shaped component; said deflector surface being separate from said shaped component and being mounted on a sidewall of said casing; a guide wedge having a surface inclined laterally towards the interior of said casing between said chain and said base and in front of said roller and a chain drive wheel in direction of rotation.

2. Chain conveyor according to claim 1, wherein said shaped component extends to a circumferential groove on said roller.

3. Chain conveyor according to claim 1, wherein said shaped component is fixed to a removable flange on said casing.

4. Chain conveyor according to claim 1, wherein said deflector surface is separate from said shaped component and is fixed to a side wall of said casing.

5. Chain conveyor according to claim 1, including a holding-down device above the chain at a distance substantially equal to guidance of the chain in the chain drive wheel.

6. Chain conveyor comprising: two chains connected together by scrapers; a casing having a base and side walls, said scrapers circulating inside said casing and being guided around roller means; a shaped component fitting around a roller of said roller means over a portion of the roller circumference in front of and above the entry of the chain into said roller in the movement direction of the chain, so that conveyed material is prevented by said shaped component from penetrating into space beneath the roller whereby the conveyed material cannot become jammed between the chain and said roller means; a deflector surface pointing towards the interior of said casing, said surface having a front edge in alignment with said shaped component; said shaped component extending to a circumferential groove on said roller; said deflector surface being separate from said shaped component and being fixed to a side wall of said casing; a guide wedge having a surface inclined laterally towards the interior of said casing between the chain and said base and in front of said roller and a chain drive wheel in direction of rotation; a holding-down device above the chain at a distance substantially equal to guidance of the chain in the chain drive wheel.

* * * * *